United States Patent
Park

(10) Patent No.: US 12,236,969 B2
(45) Date of Patent: Feb. 25, 2025

(54) METHOD FOR PROCESSING SOUND USED IN SPEECH RECOGNITION ROBOT

(71) Applicant: LG ELECTRONICS INC., Seoul (KR)

(72) Inventor: Ji Hwan Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 569 days.

(21) Appl. No.: 17/611,308

(22) PCT Filed: Jun. 18, 2019

(86) PCT No.: PCT/KR2019/007352
§ 371 (c)(1),
(2) Date: Nov. 15, 2021

(87) PCT Pub. No.: WO2020/256175
PCT Pub. Date: Dec. 24, 2020

(65) Prior Publication Data
US 2022/0238131 A1    Jul. 28, 2022

(51) Int. Cl.
| | | |
|---|---|---|
| *G10L 21/0232* | (2013.01) | |
| *B25J 11/00* | (2006.01) | |
| *G06T 7/60* | (2017.01) | |
| *G06V 20/50* | (2022.01) | |
| *G10L 15/22* | (2006.01) | |

(Continued)

(52) U.S. Cl.
CPC ....... *G10L 21/0232* (2013.01); *B25J 11/0005* (2013.01); *G06T 7/60* (2013.01); *G06V 20/50* (2022.01); *G10L 15/22* (2013.01); *G10L 21/028* (2013.01); *G10L 25/18* (2013.01);

(Continued)

(58) Field of Classification Search
CPC ............... G10L 21/0232; G10L 15/22; G10L 21/028; G10L 25/18; G10L 25/51; G10L 2015/223; G10L 2021/02082; G10L 21/0208; G10L 25/84; B25J 11/0005; B25J 11/008; B25J 9/16; B25J 19/026; B25J 9/1666;

(Continued)

(56) References Cited

U.S. PATENT DOCUMENTS

2012/0095761 A1* 4/2012 Nakadai .............. G10L 21/0272
704/E15.001
2018/0350379 A1    12/2018 Wung et al.

FOREIGN PATENT DOCUMENTS

JP           6-337286 A    12/1994
JP        2009-110495 A     5/2009
(Continued)

*Primary Examiner* — Basil T. Jos
(74) *Attorney, Agent, or Firm* — Birch, Stewart, Kolasch & Birch, LLP

(57) ABSTRACT

A method for processing sound used in a speech recognition robot is disclosed. The method for processing sound comprises the steps of: recognizing, by a robot, an obstacle on a driving path; calculating, by the robot, a driving distance to the obstacle; calculating a driving speed, by the robot; and determining, by the robot, a point in time at which a transient sound is generated by an impact caused by passing through the obstacle, wherein the point in time at which the transient sound is generated may be determined, by the robot, from the driving distance to the obstacle and the driving speed. The robot can transmit and receive a wireless signal on a mobile communication network established according to 5G (fifth generation) communication.

7 Claims, 6 Drawing Sheets

(51) Int. Cl.
*G10L 21/0208* (2013.01)
*G10L 21/028* (2013.01)
*G10L 25/18* (2013.01)
*G10L 25/51* (2013.01)

(52) U.S. Cl.
CPC ........ *G10L 25/51* (2013.01); *G10L 2015/223* (2013.01); *G10L 2021/02082* (2013.01)

(58) Field of Classification Search
CPC ................. B25J 19/023; G06T 7/60; G06T 2207/30261; G06T 7/70; G06V 20/50; G06V 20/58
See application file for complete search history.

(56) References Cited

FOREIGN PATENT DOCUMENTS

| | | |
|---|---|---|
| JP | 2017-90606 A | 5/2017 |
| JP | 2018-520408 A | 7/2018 |
| KR | 10-1497574 B1 | 3/2015 |
| KR | 10-2016-0046440 A | 4/2016 |
| KR | 10-2018-0046062 A | 5/2018 |
| KR | 10-2018-0085309 A | 7/2018 |
| KR | 10-2018-0115984 A | 10/2018 |

* cited by examiner (a)

(b)

METHOD FOR PROCESSING SOUND USED IN SPEECH RECOGNITION ROBOT

CROSS REFERENCE TO RELATED APPLICATIONS

This application is the National Phase of PCT International Application No. PCT/KR2019/007352, filed on Jun. 18, 2019, which is hereby expressly incorporated by reference into the present application.

FIELD

Embodiments relate to a method for processing sound used in a speech recognition robot capable of autonomous driving.

BACKGROUND

The contents described herein merely provide background information for embodiments and do not constitute prior art.

With the development of technology, various services to which speech recognition technology is applied have recently been introduced in many fields. Speech recognition technology involves a series of procedures for understanding human speech and converting the speech into text information that can be handled by a computer, and a speech recognition service using the speech recognition technology may include a series of procedures for recognizing a user's speech and providing an appropriate service corresponding thereto.

Speech recognition technology is applied to various robots provided for the convenience of users, and the development of a technology that enables a robot to recognize a user's speech command so as to perform an operation according to the command is actively being researched.

In the case of a speech recognition robot capable of autonomous driving, if the robot passes through an obstacle encountered while traveling, the robot may receive an impact, and a transient sound with a short time interval and high intensity may be generated due to the impact.

The transient sound may cause interference with the robot's recognition of a user's speech, which may ultimately cause deterioration of the speech recognition performance of the robot. This issue needs to be addressed.

In US Patent Application Publication US 2018/0350379 A1, a pre-processing method for recognizing speech from a signal inputted to a multi-channel microphone is disclosed. However, in this related art, countermeasures for a transient sound generated when an autonomously driving speech recognition robot passes through an obstacle are not disclosed.

In US Patent Application Publication US 2012/0095761 A1, countermeasures for deterioration in speech recognition performance due to predictable ego noise are disclosed. However, similarly, in this related art, countermeasures for a transient sound generated when an autonomously driving speech recognition robot passes through an obstacle are not disclosed.

SUMMARY

Embodiments are directed to proposing a method for accurately measuring a period in which a transient sound generated when an autonomously driving robot passes through an obstacle exists, that is, a period from a generation point to an end point of a transient sound.

The embodiments are further directed to proposing a method for effectively responding to a case where a transient sound affects the speech recognition performance of the robot.

The embodiments are further directed to proposing a method for effectively responding to a case where speech recognition by the robot is deteriorated due to a transient sound inputted to the robot.

The embodiments are not limited to what has been described above, and other aspects not mentioned may be clearly understood by those skilled in the art to which the embodiment belongs, based on the following description.

In view of the foregoing, a robot may, upon recognizing an obstacle while traveling, determine a time it takes to travel from a current location of the robot to the obstacle, so as to determine a time at which a transient sound is generated.

A method for determining a time at which a transient sound is generated may include: recognizing an obstacle existing in a travel path, by a robot; calculating a travel distance to the obstacle, by the robot; calculating a travel speed, by the robot; and determining, by the robot, a point in time at which a transient sound generated due to an impact caused by passing through the obstacle is generated.

The robot may determine the point in time at which the transient sound is generated, from the travel distance to the obstacle and the travel speed.

The robot may recognize the obstacle by using a mounted camera, and when the robot is traveling, may determine whether to pass through the obstacle.

The robot may recognize the obstacle from map data, and when the robot is traveling, may determine whether to pass through the obstacle.

The robot may determine a period in which the transient sound exists, based on the point in time at which the transient sound is generated.

A method for determining a period in which a transient sound exists may include: performing a short time Fourier transform on a received sound; analyzing a characteristic of the received sound; classifying the received sound; and determining a period in which the transient sound exists.

The period in which the transient sound exists may correspond to a value obtained by adding a first period and a second period, wherein the first period is determined from a sound signal received by a microphone equipped in the robot, and the second period is determined from the robot's travel speed and travel distance to an obstacle that causes the transient sound.

The analyzing of the characteristic of the received sound may include: separating a harmonic sound and a percussive sound in the received sound; and determining, based on the percussive sound, whether the transient sound exists.

The robot may recognize a user's speech command from the received sound, and may estimate and remove a speech recognition interference factor from the received sound.

The robot may stop estimating the speech recognition interference factor in the period in which the transient sound exists, or may stop recognizing the user's speech command in the period in which the transient sound exists.

The robot may estimate the user's speech command inputted in the period in which the transient sound exists, wherein, among sentences stored in the robot, a sentence most similar to a sentence uttered by the user may be estimated to be the user's speech command.

The robot may connect a first sound period, which is a sound period before the period in which the transient sound exists, and a second sound period, which is a sound period after the period in which the transient sound exists, wherein the rear end of the first sound period and the front end of the second sound period are connected to each other in an overlapping manner.

The robot may connect the first sound period, which is a sound period before the period in which the transient sound exists, and the second sound period, which is a sound period after the period in which the transient sound exists, wherein convolution or multiplication of a window function is performed on sound signals existing in the first sound period and the second sound period.

According to the embodiments, a robot capable of speech recognition and autonomous driving can accurately determine a period in which a transient sound generated due to an impact when the robot passes through an obstacle exists, by determining a travel distance and a travel speed, and based on this, the robot can effectively respond to deterioration of speech recognition performance due to the transient sound.

According to the embodiments, the robot can effectively suppress deterioration of speech recognition performance caused by interference from the transient sound, by stopping estimation of a speech recognition interference factor in the period in which the transient sound exists or stopping speech recognition in the period in which the transient sound exists.

According to the embodiments, the robot can effectively suppress occurrence of a speech recognition error due to the transient sound, by estimating a user's speech command in a period in which speech command recognition is stopped or estimation of the speech recognition interference factor is stopped due to the transient sound.

The robot can accurately recognize the user's speech command without interference from the transient sound, by recognizing the user's speech command in a sound signal from which the period in which the transient sound exists has been excluded.

DETAILED DESCRIPTION

Figure 1:
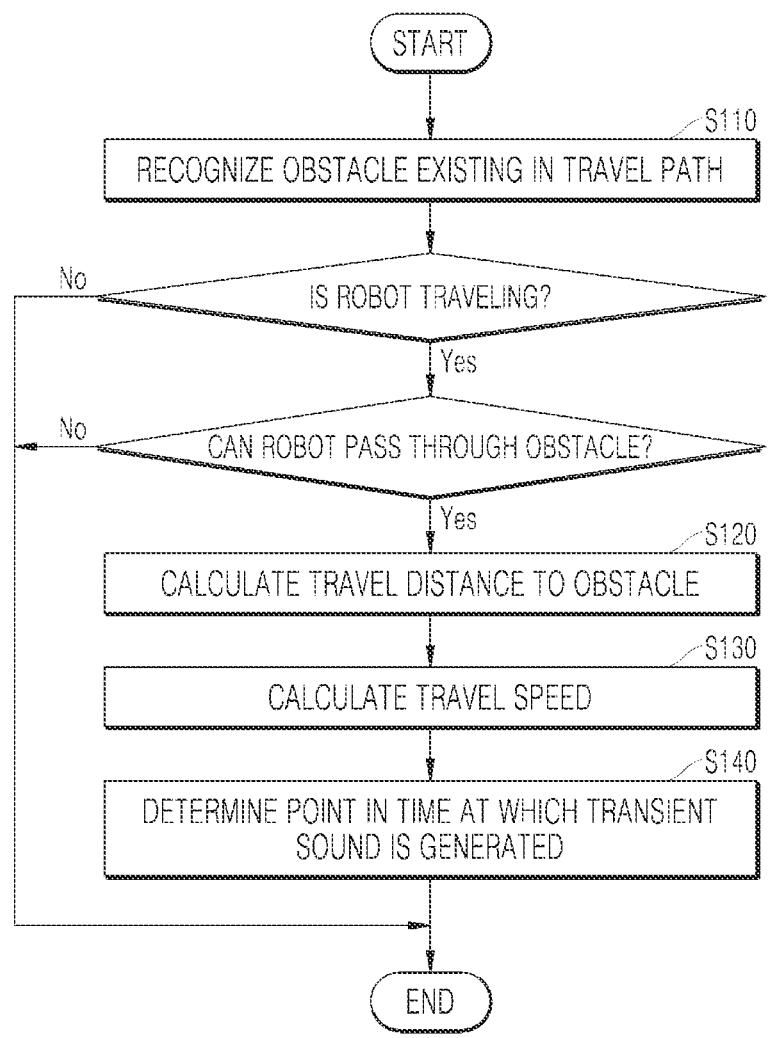
FIG. 1 is a flowchart for illustrating a method for processing sound according to an embodiment.

Hereinafter, embodiments will be described in detail with reference to the accompanying drawings. While the embodiments are susceptible to various modifications and alternative forms, specific embodiments are shown by way of example in the drawings and are explained in detail in the description. However, this is not intended to limit the embodiments to a specific disclosed form, and it should be understood that the present disclosure includes all modifications, equivalents, or alternatives falling within the spirit and technical scope of the embodiments.

Although the terms "first", "second", etc. may be used to describe various elements, these elements are not to be limited by these terms. These terms are only used to distinguish one element from another. In addition, terms particularly defined in consideration of the configuration and operation of the embodiments are used only to describe the embodiments, and do not define the scope of the embodiments.

In descriptions of embodiments, when each element is referred to as being formed "on (above)" or "under (below)" the other element, the each element may be directly "on" or "under" the other element or may be indirectly formed with one or more intervening elements therebetween. When an expression indicates "on (above)" or "under (below)" an element, this may include an upward direction as well as a downward direction of the element.

Relational terms used hereinafter, such as "on/upper part/above" and "under/lower part/below", may be used only to distinguish between one subject or element and another subject or element, without necessarily requiring or involving any physical or logical relationship or sequence between such subjects or elements.

Figure 2:
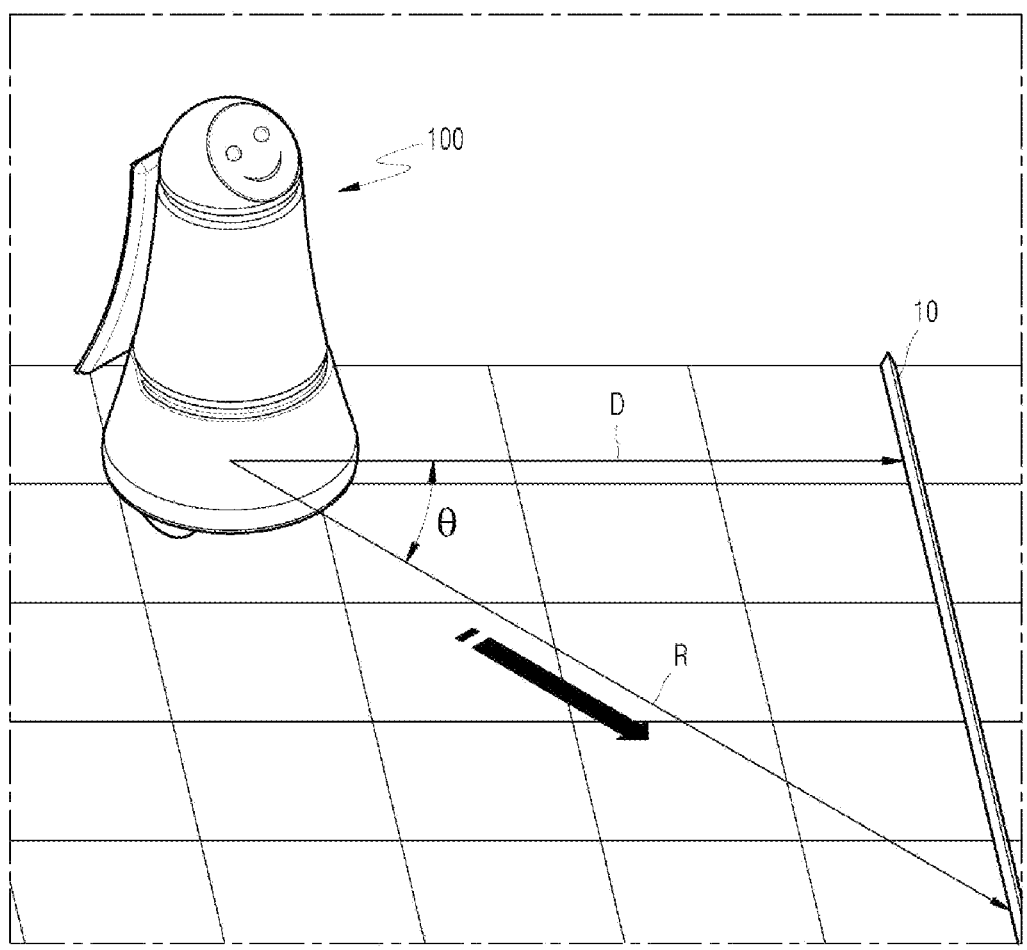
FIG. 2 is a diagram for illustrating an operation of a robot according to an embodiment.

FIG. 1 is a flowchart for illustrating a method for processing sound according to an embodiment. FIG. 2 is a diagram for illustrating an operation of a robot 100 according to an embodiment. The robot 100 may have a speech recognition function capable of recognizing a user's speech so as to perform a command requested by the user. The robot 100 may be provided to be capable of autonomous driving, and may be used for home and industrial purposes as well as other various purposes.

The robot 100 may include a microphone configured to recognize a speech command of a user, and may include a camera configured to recognize a person, an object, an obstacle 10 to travelling, and the like in the vicinity. The robot 100 may include a speaker, a display, and the like so as to interact with a person such as a user. A controller, a storage, a transceiver, etc. may be included for communication, calculation, and input/output of information required for speech recognition, command execution, autonomous driving, and the like.

The robot 100 may be connected to a server and may communicate with the server so as to exchange necessary information therewith. If necessary, the server may control operations of the robot 100, such as speech recognition, command execution, and autonomous driving, may perform calculations required for the operations, and may transmit, to the robot 100, for example, map data required for autonomous driving of the robot 100.

The robot 100 includes a mobile communications module and may communicate with, for example, a server and a user terminal of a user via the mobile communications module. The mobile communication module may transmit or receive a radio signal on a mobile communication network constructed according to technical standards or communication schemes for mobile communication (for example, global system for mobile communication (GSM), code division multi access (CDMA), code division multi access 2000 (CDMA2000), enhanced voice-data optimized or enhanced voice-data only (EV-DO), wideband CDMA (WCDMA), high speed downlink packet access (HSDPA), high speed uplink packet access (HSUPA), long term evolution (LTE), long term evolution-advanced (LTE-A), etc.), and 5G (fifth generation) communication.

For example, the robot 100, the server, and the user terminal may also include the aforementioned 5G communication module. In this case, the robot 100, the server, and the user terminal are capable of transmitting data at a speed of 100 Mbps to 20 Gbps, so as to transmit a large amount of voice or image data very quickly. Accordingly, the server and the user terminal may recognize a large amount of voice or image data transmitted from the robot 100 more quickly and more accurately.

The robot 100, the server, and the user terminal including the 5G communication module may support various kinds of object-to-object intelligent communication (such as Internet of things (IoT), Internet of everything (IoE), and Internet of small things (IoST)), and the robot 100 may support communication such as machine to machine (M2M) communication, vehicle to everything communication (V2X), and device to device (D2D) communication. Accordingly, the robot 100 may share information, which can be acquired in a space, with other various devices very efficiently.

The robot 100 may perform machine learning, such as deep learning, with respect to an inputted speech command of a user, and may store data used for machine learning, result data, and the like.

Machine learning corresponds to an area of artificial intelligence that includes the field of study that gives computers the capability to learn without being explicitly programmed. Specifically, machine learning is a technology that investigates and constructs systems, and algorithms for such systems, which are capable of learning, making predictions, and enhancing their own performance based on experiential data. Machine learning algorithms, rather than only executing rigidly-set static program commands, may be used to take an approach that builds models for deriving predictions and decisions from inputted data.

Numerous machine learning algorithms have been developed for data classification in machine learning. Representative examples of such machine learning algorithms for data classification include a decision tree, a Bayesian network, a support vector machine (SVM), an artificial neural network (ANN), and so forth.

A decision tree may include an analysis method for performing classification and prediction by using a tree-like graph or model of decision rules.

A Bayesian network may include a model that represents a probabilistic relationship (conditional independence) between a plurality of variables in a graph structure. The Bayesian network may be appropriate for data mining via unsupervised learning.

A support vector machine is a model of supervised learning for pattern recognition and data analysis, and may be mainly used for classification and regression analysis.

The robot 100 may be equipped with an artificial neural network, and may perform machine learning-based user recognition and user speech recognition by using a received speech input signal as input data.

An artificial neural network may include an information processing system modelled after the mechanism of biological neurons and interneuron connections, in which multiple neurons, referred to as nodes or processing elements, are interconnected in layers. Artificial neural networks are models used in machine learning and may include statistical learning algorithms conceived from biological neural networks (particularly of the brain in the central nervous system of an animal) in machine learning and cognitive science. Specifically, artificial neural networks may generally refer to models that have artificial neurons (nodes) forming a network through synaptic interconnections, and acquire problem-solving capability as the strengths of synaptic interconnections are adjusted via training.

The terms "artificial neural network" and "neural network" may be used interchangeably herein.

The artificial neural network may include multiple layers, and each of the multiple layers may include multiple neurons. The artificial neural network may include synapses that connect neurons to other neurons.

The artificial neural network may be defined, in general, by the following three factors: (1) a connection pattern between neurons in different layers; (2) a learning procedure of updating weights of connections; and (3) an activation function for generating an output value from a weighted sum of inputs received from a previous layer.

The robot 100 may include an artificial neural network, for example, network models such as a deep neural network (DNN), a recurrent neural network (RNN), a bidirectional recurrent deep neural network (BRDNN), a multilayer perceptron (MLP), and a convolutional neural network (CNN), but is not limited thereto.

In this specification, the term "layer" may be used interchangeably with the term "tier."

An artificial neural network may be categorized as a single layer neural network or a multilayer neural network, based on the number of layers therein.

General single layer neural networks may include an input layer and an output layer. General multilayer neural networks may include an input layer, one or more hidden layers, and an output layer.

The input layer may be a layer configured to receive external data, and the number of neurons of the input layer may be the same as the number of input variables. The hidden layer may be located between the input layer and the output layer, may receive a signal from the input layer, and may extract a characteristic from the received signal, and transfer the extracted characteristic to the output layer. The output layer may receive the signal from the hidden layer and may output an output value based on the received signal. The input signal between neurons may be multiplied by each connection strength (weight), and then values obtained therefrom may be summated, wherein if the sum of the values is greater than a threshold value of a neuron, the neuron is activated, and an output value obtained via an activation function is outputted.

A deep neural network including multiple hidden layers between an input layer and an output layer may be a representative artificial neural network implementing deep learning, which is one type of machine learning technology.

Meanwhile, the term "deep learning" may be used interchangeably with the term "deep layer learning."

The artificial neural network may be trained using training data. Here, training may refer to the process of determining parameters of the artificial neural network by using the training data, to perform tasks such as classification, regression analysis, and clustering of inputted data. A representative example of a parameter of the artificial neural network may include a weight assigned to a synapse or a bias applied to a neuron.

The artificial neural network trained using training data may classify or cluster inputted data according to a pattern of the inputted data.

In this specification, the artificial neural network trained using training data may be referred to as a trained model.

Hereinafter, a learning scheme of the artificial neural network, which is performed by a music robot 100 will be described.

Learning paradigms of the artificial neural network may be broadly classified into supervised learning, unsupervised learning, semi-supervised learning, and reinforcement learning.

Supervised learning may include a machine learning method that derives a single function from the training data.

Among the functions that may be thus derived, a function that outputs a continuous range of values may be referred to as a regression, and a function that predicts and outputs the class of an input vector may be referred to as a classifier.

In supervised learning, an artificial neural network can be trained with training data that has been given a label.

Here, the label may refer to a target answer (or a result value) to be guessed by the artificial neural network when the training data is inputted to the artificial neural network.

In this specification, the target answer (or a result value) to be guessed by the artificial neural network when the training data is inputted may be referred to as a label or labeling data.

In this specification, assigning one or more labels to training data in order to train an artificial neural network may be referred to as labeling the training data with labeling data.

Training data and labels corresponding to the training data together may form a single training set, and as such, they may be input to an artificial neural network as a training set.

The training data may exhibit a number of features, and the training data being labeled with the labels may be interpreted as the features exhibited by the training data being labeled with the labels. In this case, the training data may represent a feature of an input object in the form of a vector.

The artificial neural network may derive a correlation function between training data and labeling data by using the training data and the labeling data. Then, through evaluation of the function derived from the artificial neural network, a parameter of the artificial neural network may be determined (optimized).

Unsupervised learning is a machine learning method that learns from training data that has not been given a label.

Specifically, unsupervised learning may be a training scheme that trains an artificial neural network to discover a pattern within given training data and perform classification by using the discovered pattern, rather than by using a correlation between given training data and labels corresponding to the given training data.

Examples of unsupervised learning include, but are not limited to, clustering and independent component analysis.

In this specification, the term "clustering" may be used interchangeably with the term "grouping."

Examples of artificial neural networks using unsupervised learning include, but are not limited to, a generative adversarial network (GAN) and an autoencoder (AE).

A generative adversarial neural network may include a machine learning method in which two different artificial intelligences, a generator and a discriminator, improve performance while competing with each other.

In this case, the generator is a model configured to generate new data, and may generate new data based on original data.

The discriminator is a model configured to recognize a pattern of data, and may determine whether input data is original data or new data generated by the generator.

The generator may receive data that has failed to fool the discriminator and perform learning therefrom, and the discriminator may receive data that has succeeded in fooling from the generator and perform learning therefrom. Accordingly, the generator may evolve so as to fool the discriminator as effectively as possible, and the discriminator may evolve so as to effectively distinguish data generated by the generator from original data.

An auto-encoder may include a neural network which aims to reconstruct its input as output.

The auto-encoder may include an input layer, at least one hidden layer, and an output layer. In this case, since the number of nodes in the hidden layer is smaller than the number of nodes in the input layer, the dimensionality of data is reduced, and thus compression or encoding may be performed.

Data outputted from the hidden layer may be inputted to the output layer. In this case, since the number of nodes in the output layer is greater than the number of nodes in the hidden layer, the dimensionality of data increases, and thus decompression or decoding may be performed.

In the auto-encoder, the inputted data is represented as hidden layer data as interneuron connection strengths are adjusted through training. The fact that the hidden layer is able to reproduce the input data as output even though the hidden layer expresses information by using fewer neurons compared to the input layer may indicate that the hidden layer has discovered a hidden pattern from the input data and expressed the information by using the discovered pattern.

Semi-supervised learning is a type of machine learning, and may refer to a learning method using both labeled training data and unlabeled training data.

One semi-supervised learning technique involves inferring the label of unlabeled training data, and then using this inferring label for learning. This technique may be used advantageously when the cost associated with the labeling process is high.

Reinforcement learning may include a theory that, in a given environment in which an agent is able to determine a proper action to be taken at each instance, the agent is able to find an optimal path from experience without data.

Reinforcement learning may be performed mainly by a Markov decision process (MDP).

Markov decision process may be described as follows: first, an environment, in which information necessary for an agent to take a subsequent action is configured, is given; second, actions to be taken by the agent in the environment are defined; third, an action which rewards the agent when successfully performed, and an action which gives a penalty when poorly performed, are defined; and fourth, the agent iterates until future reward is maximized, thereby deriving an optimal policy.

For the artificial neural network, a structure thereof may be specified by an activation function, a loss function or a cost function, a learning algorithm, an optimization algorithm, and the like, a hyper-parameter may be preconfigured before learning, and then a model parameter may be configured via learning so as to enable specification of contents.

For example, factors for determination of the structure of the artificial neural network may include the number of hidden layers, the number of hidden nodes included in each hidden layer, an input feature vector, a target feature vector, and the like.

Hyperparameters may include various parameters which need to be initially set for learning, such as the initial values of model parameters. The model parameters may include multiple parameters to be determined via learning.

For example, the hyperparameters may include initial values of weights and biases between nodes, mini-batch size, iteration number, learning rate, and the like. Further-more, the model parameters may include a weight between nodes, a bias between nodes, and the like.

Loss function may be used as an index (reference) in determining an optimal model parameter during the learning process of the artificial neural network. In the artificial neural network, learning may refer to adjusting model parameters so as to reduce the loss function, and the purpose of learning may be to determine the model parameters that minimize the loss function.

The loss function may typically use means squared error (MSE) or cross entropy error (CEE), but the present disclosure is not limited thereto.

Cross-entropy error may be used when a true label is one-hot encoded. One-hot encoding may include an encoding method in which among given neurons, only those corresponding to a target answer are given 1 as a true label value, while those neurons that do not correspond to the target answer are given 0 as a true label value.

In machine learning or deep learning, a learning optimization algorithm may be used to minimize the loss function, and the learning optimization algorithm may include gradient descent (GD), stochastic gradient descent (SGD), momentum, Nesterov accelerate gradient (NAG), Adagrad, AdaDelta, RMSProp, Adam, Nadam, and the like.

The gradient descent may include a technique of adjusting a model parameters in a direction that decreases the output of a cost function by using a current slope of the cost function.

The direction in which the model parameters are to be adjusted may be referred to as a step direction, and a size by which the model parameters are to be adjusted may be referred to as a step size.

The step size may refer to a learning rate.

Gradient descent may include acquiring a slope of the cost function through use of partial differential equations, using each of model parameters, and updates the model parameters by adjusting the model parameters by a learning rate in the direction of the acquired slope.

Stochastic gradient descent may include a technique of dividing training data into mini-batches and performing gradient descent for each mini-batch, thereby increasing a frequency of gradient descent.

Adagrad, AdaDelta, and RMSProp may include a technique of increasing optimization accuracy by adjusting a step size in SGD. In SGD, momentum and NAG may include a technique of increasing optimization accuracy by adjusting a step direction. Adam may include a technique of increasing optimization accuracy by adjusting a step size and a step direction via combination of momentum and RMSProp. Nadam may include a technique of increasing optimization accuracy by adjusting a step size and a step direction via combination of NAG and RMSProp.

A learning rate and accuracy of an artificial neural network may depend on not only a type of a learning optimization algorithm and a structure of the artificial neural network but also on the hyper-parameters thereof. Therefore, in order to obtain a good learning model, it may be important to configure appropriate hyper-parameters as well as to determine appropriate learning algorithms and an appropriate structure for the artificial neural network.

In general, the artificial neural network is first trained by experimentally setting hyperparameters to various values, and based on the results of training, the hyperparameters can be set to optimal values that provide a stable learning rate and accuracy.

The robot 100 in an embodiment may recognize a user's speech command while traveling, and may perform an operation according to the speech command. When the robot 100 passes through an obstacle 10, such as an electric cable, a doorsill, or a join on the floor, while traveling, a transient sound, which is a short and loud noise, may be generated.

When this transient sound is inputted to the robot 100 via a microphone, the speech recognition performance of the robot 100 may be greatly deteriorated. Since such a transient sound is irregular and loud, a user's speech command may be obscured thereby. Accordingly, the robot 100 may not be able to recognize the user's speech command, and a malfunction may thus occur when the transient sound is generated.

In an embodiment, a method of accurately identifying, by the robot 100, a period and a point in time at which the transient sound is generated, and a method capable of improving the speech recognition performance of the robot 100 when the transient sound is generated, are proposed.

Hereinafter, a method of accurately determining a point in time at which a transient sound is generated will be described with reference to FIG. 1, FIG. 2, etc. The robot 100 may recognize an obstacle 10 existing in a travel path (S110). In an embodiment, the robot 100 may recognize the obstacle 10 by using a mounted camera. In another embodiment, the robot 100 may be equipped with a light detection and ranging (LIDAR) sensor, and may recognize the obstacle 10 by using the LIDAR sensor.

Hereinafter, a case of recognizing the obstacle 10 by using a camera will be described by way of example. The camera may be, for example, a depth camera capable of detecting the existence of the obstacle 10 and measuring a distance from the robot 100 to the obstacle 10.

When the robot 100 is currently traveling, the robot 100 may determine whether to pass through the obstacle 10. When it is determined that the height of the obstacle 10 is relatively low or the risk of damage to the robot 100 due to passing through the obstacle is low, and the robot 100 determines to pass through the obstacle 10, the robot 100 may calculate an expected travel distance R to the obstacle 10 (S120).

In a case where the robot 100 is not traveling, when the robot 100 makes a detour without passing through the obstacle 10, a transient sound is, naturally, not generated, and it is thus not necessary to calculate the travel distance R to the obstacle 10.

Referring to FIG. 2, the robot 100 may determine, using the mounted camera, a shortest distance D measured along a shortest path to the obstacle 10.

The robot 100 may measure an angle θ at which a travel path is separated apart from the shortest path. The robot 100 may measure the separation angle θ by comparing the difference between a current travel direction and a direction in which the camera is viewing the shortest path.

The robot 100 may calculate the travel distance R to the obstacle 10 based on the shortest distance D and the separation angle θ. Here, the relationship between the travel distance R, the separation angle θ, and the shortest distance D may be expressed by Equation 1 below.

$$R = \frac{1}{\cos\theta} D \quad \text{[Equation 1]}$$

In another embodiment, the robot 100 may recognize the obstacle 10 from map data stored in the robot 100. Based on the map data used for traveling of the robot 100, the robot 100 may determine a location of the obstacle 10, and a distance from a current location of the robot 100 to the obstacle 10.

As in the case of recognizing the obstacle 10 by using the camera, the robot 100 may determine whether to pass through the obstacle 10 when the robot 100 is currently traveling. Based on information relating to the location, structure, etc. of the obstacle 10, which is obtained via the map data, when it is determined that the height of the obstacle 10 is relatively low or the risk of damage to the robot 100 due to passing through the obstacle is low, and the robot 100 determines to pass through the obstacle 10, the robot 100 may calculate the travel distance R to the obstacle 10 (S120).

Here, the robot 100 may calculate the travel distance R to the obstacle 10 based on the map data. When the robot 100 moves from its current location to a desired travel path based on the map data, the robot 100 may determine the distance to the obstacle 10, that is, the travel distance R.

Accordingly, the robot 100 may calculate the travel distance R based directly on the map data, and a separate calculation using the aforementioned Equation 1 may be unnecessary.

The robot 100 may calculate its own travel speed (S130). For example, the robot 100 may be equipped with a speedometer, a GPS device, and other devices capable of measuring speed, and may calculate its own current travel speed by means of these devices.

The robot 100 may determine a point in time at which a transient sound is generated due to an impact caused by passing through the obstacle 10 (S140). If the robot 100 identifies a transient sound via the microphone, the robot 100 may recognize generation of the transient sound for the first time at a time later than a time when the transient sound is actually generated due to occurrence of the impact.

Figure 5:
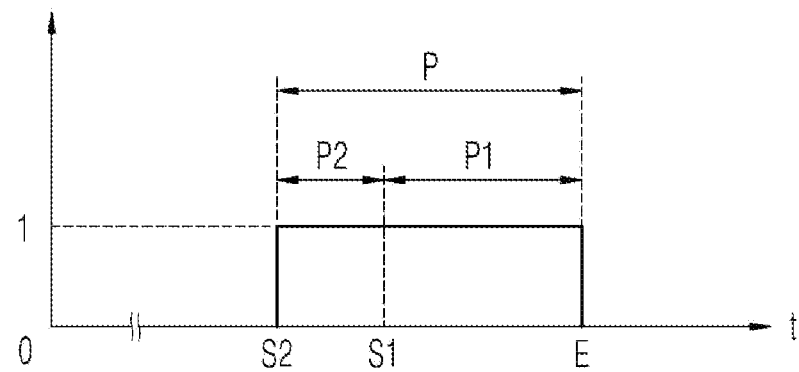
FIG. 5 is a diagram for illustrating a period in which the transient sound exists according to an embodiment.

This is because it takes some time for the robot 100 to process an external input, and thus there is a difference between the time at which the transient sound is actually generated and a time at which the transient sound is inputted via the microphone and the robot 100 recognizes the generation of the transient sound. In FIG. 5, a time at which a transient sound is actually generated is referred to as a second time point S2, and a time at which the robot 100 recognizes generation of the transient sound is referred to as a first time point S1, wherein the second time point S2 may precede the first time point S1 in time.

Hereinafter, a method of determining a first time point S1, that is, a point in time at which a transient sound is actually generated, will be described in detail. The point in time at which the transient sound is generated may be determined by the robot 100 based on a travel distance R to the obstacle 10 and a travel speed.

The robot 100 may calculate an arrival time T1 at a transient sound generation point by dividing the travel distance R by the travel speed, and may determine, based on the arrival time T1, the point in time at which the transient sound is generated.

The arrival time T1 may refer to a time taken by the robot 100 to reach the obstacle 10 when the robot 100 moves from the current location to the obstacle 10 along the travel path at the current speed, and the relationship between the arrival time T1, the travel distance R, and the travel speed may be expressed by Equation 2 below.

$$T1 = \frac{R}{v} \quad \text{[Equation 2]}$$

For example, if the calculated arrival time T1 is added to the current time, the point in time at which the transient sound is actually generated, that is, the second time point S2, may be obtained.

According to the aforementioned method, the robot 100 may accurately determine a point in time at which a transient sound is generated, before generation of the transient sound. Hereinafter, a method for identifying a period in which the transient sound exists P based on a point in time at which the transient sound is generated will be described in detail.

Figure 3:
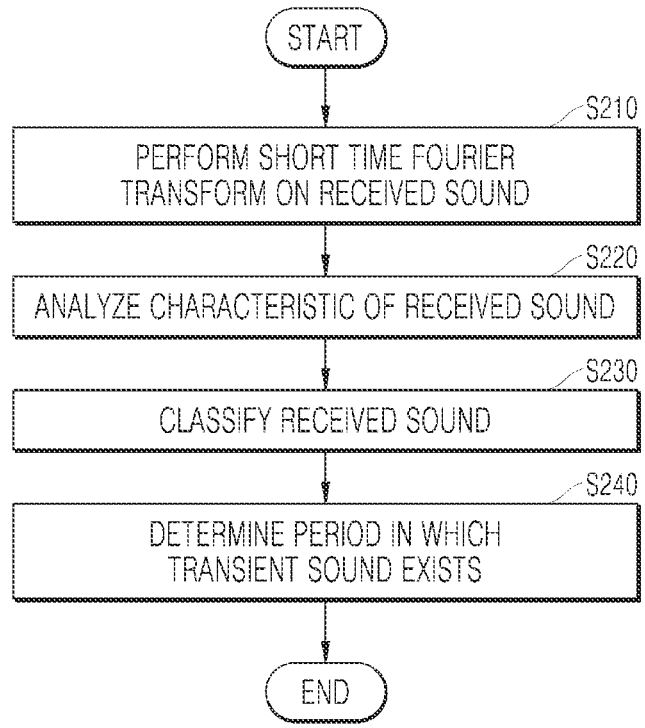
FIG. 3 is a flowchart for illustrating a method for processing sound according to another embodiment.
Figure 4:
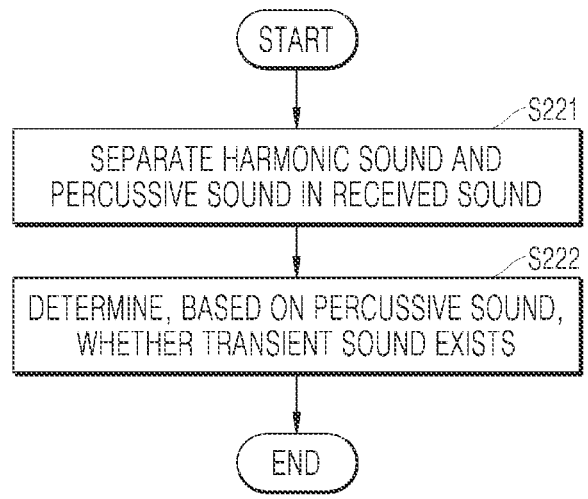
FIG. 4 is a flowchart for illustrating a method of analyzing a characteristic of a received sound according to an embodiment.

FIG. 3 is a flowchart for illustrating a method for processing sound according to another embodiment. FIG. 4 is a flowchart for illustrating a method of analyzing a characteristic of a received sound according to an embodiment.

Referring to FIG. 3, the robot 100 may perform a short time Fourier transform on a sound received from a microphone (S210). If the short-time Fourier transform is performed on a voice signal inputted to the microphone, distribution of various sounds included in the inputted sound, i.e., a voice, a transient sound generated due to an impact, and other noise, over time may be identified. Each sound has a different frequency component, and the distribution of each sound by frequency and by time may be identified via the short-time Fourier transform.

The robot 100 may analyze a characteristic of the received sound (S220). Here, it can be determined whether a transient sound exists by analyzing the characteristics of each sound included in the received sound.

Referring to FIG. 4, the analyzing of the characteristic of the received sound may include separating each sound included in the received sound and determining whether a transient sound exists.

In the separating of each sound included in the received sound, the robot 100 may separate a harmonic sound and a percussive sound in the received sound (S221). Since a human voice includes a harmonic component, the harmonic sound may be a human voice.

For example, a harmonic sound is maintained for a relatively long time and has a relatively low intensity, whereas a percussive sound is maintained for a relatively short time and has a relatively high intensity. In consideration of these characteristics, the robot 100 may separate a harmonic sound and a percussive sound in the inputted sound.

By separating a harmonic sound in the received sound, interference caused by a human voice can be removed, and it can thus easily be determined whether a transient sound exists.

The determining of whether a transient sound exists may include determining, from the percussive sound, whether the transient sound exists (S222). Various sounds other than a human voice may exist in the percussive sound.

For example, the percussive sound may include a transient sound generated when the robot 100 passes through the obstacle 10, a collision sound generated due to a fall of an object in the vicinity of the robot 100, and the like. Therefore, the analyzing of the characteristic of the received sound may include measuring at least one of power or spectral flux of the received sound, in order to accurately determine, from the percussive sound, whether a transient sound exists.

Here, the power indicates the intensity of a sound, and the unit therefor may be dB. The spectral flux may indicate the distribution of the inputted sound over time.

The robot 100 may determine whether a transient sound exists in the percussive sound in consideration of the measured power and spectral flux. For example, when the measured power exceeds a set range or the measured spectral flux is similar to a set distribution, it may be determined that a transient sound exists.

Data required for determining, based on the power and the spectral flux, whether a transient sound exists, may be acquired and stored by the robot 100 via machine learning. The robot 100 may determine whether a transient sound exists by using the data acquired via machine learning.

The robot 100 may classify the received sound (S230). For example, the robot 100 may classify the inputted sound into a harmonic sound, a transient sound, and other sounds. This classification may include separating each sound included in the received sound and determining a characteristic of each sound, for example, an existing period, an intensity, etc., by the robot 100.

The robot 100 may clearly identify a transient sound time point identified from a microphone input, i.e., a first time point S1 described below, and a period in which the transient sound exists P, i.e., a first period P1 described below, by identifying the transient sound distinctively from other sounds via sound classification.

When the robot 100 determines, via the aforementioned procedures, that a transient sound exists, the robot 100 may determine a period in which the transient sound exists P (S240).

FIG. 5 is a diagram for illustrating a period in which the transient sound exists P according to an embodiment. In FIG. 5, the horizontal axis indicates time, and the vertical axis indicates whether a transient sound exists. For clarity, in the vertical axis of FIG. 5, 1 indicates the presence of a transient sound, and 0 indicates the absence of a transient sound.

As described above, a point in time at which a transient sound is actually generated and a time at which the robot 100 recognizes the transient sound from the microphone are different from each other.

This is because it takes some time for the robot 100 to detect and process an external event by using a processing means (i.e., a processor) and a sensing means embedded in the robot 100. A point in time at which a transient sound is actually generated may precede a time at which the robot 100 recognizes the transient sound.

Referring to FIG. 5, the period in which the transient sound exists P may be expressed as time, and may be configured to be a value obtained by summing a first period P1 and a second period P2.

The first period P1 may be determined from a sound signal received by the microphone provided in the robot 100. That is, the first period P1 may be measured as a time period from a first time point S1 at which the robot 100 recognizes the transient sound that is inputted to the microphone to an end point E at which the transient sound ends. The first time point S1 is a point in time at which the robot 100 actually recognizes the transient sound inputted via the microphone.

The end point E refers to a point in time at which the transient sound inputted via the microphone no longer continues. In other words, the end point E is a point in time at which the robot 100 actually recognizes that the transient sound is no longer being inputted via the microphone.

That is, the first period P1 refers to a period in which the robot 100 recognizes the transient sound inputted via the microphone.

The second period P2 may be determined from a travel speed and a travel distance R of the robot 100 to the obstacle 10 that generates the transient sound. That is, the second period P2 may be measured as a time period from a second time point S2 at which the robot 100 reaches the obstacle 10 to the first time point S1. The second time point S2 is a point in time at which the transient sound is actually generated.

A method of determining, by the robot 100, the second time point S2 from the travel speed and the travel distance R to the obstacle 10 has already been described in detail.

As described above, the period in which the transient sound exists P is configured to be a value obtained by determining the first period P1 and the second period P2 and summing the first period P1 and the second period P2.

In an embodiment, the robot 100 capable of speech recognition and autonomous driving can accurately determine the period P, in which a transient sound generated due to an impact when passing through the obstacle 10 exists, by determining a travel distance R and a travel speed, and based on this, the robot 100 can effectively respond to deterioration of speech recognition performance due to the transient sound.

If there is a user's speech command in the period in which the transient sound exists P, a transient sound having a large intensity may affect the recognition of the speech command by the robot 100. Hereinafter, a method for responding to interference due to a transient sound when the robot 100 recognizes a user's speech command will be described in detail.

Figure 6:
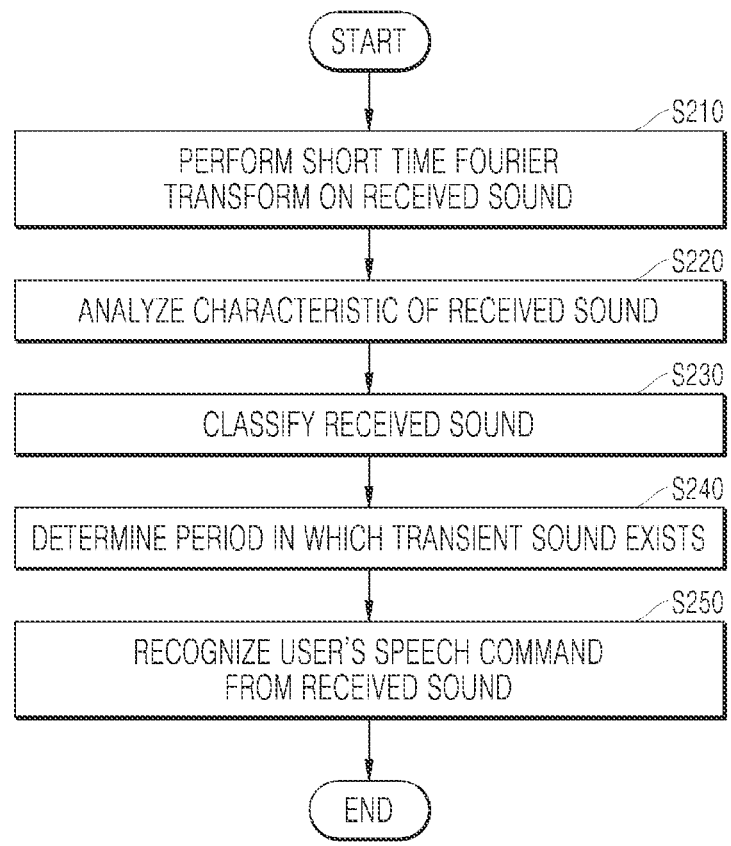
FIG. 6 is a flowchart for illustrating a method for processing sound according to another embodiment.

FIG. 6 is a flowchart for illustrating a method for processing sound according to another embodiment.

After determining the period in which the transient sound exists P, the robot 100 may recognize the user's speech command from the received sound (S250). Here, the robot 100 may estimate and remove a speech recognition interference factor from the received sound.

The estimation of the speech recognition interference factor may include noise estimation, echo estimation, reverberation estimation, and the like. In order to accurately recognize the speech command from the inputted sound, the robot 100 may estimate and remove the speech recognition interference factor.

The speech recognition interference factor may be noise other than a human voice, an echo of sound inputted via the microphone, reverberation, and the like. The robot 100 may recognize speech relatively clearly by estimating and removing these interference factors. With respect to the speech separated via removal of these interference factors, the robot 100 may recognize the user's speech command via a procedure such as speaker recognition.

When the robot 100 estimates and removes the speech recognition interference factors, significantly complicated calculations may be required, and thus a relatively large amount of time may be consumed. Therefore, when the robot 100 performs such a task, even after the interference factors have disappeared, estimation and removal processing for the interference factors is maintained for a certain period of time.

In a case where the interference factors have disappeared, and the user utters a speech command in a period in which estimation and removal processing for the interference factors is still in progress, the robot 100 may distort the user's speech, and the speech recognition performance of the robot 100 may thus be deteriorated.

This is because the robot 100 may estimate all or a part of the user's speech command that is inputted during the estimation and removal of the interference factors as an interference factor, and remove the same.

The period in which the transient sound exists P is very short in time. Accordingly, if estimation and removal processing for the interference factors is performed to remove the transient sound in the period in which the transient sound exists P, the speech recognition performance of the robot 100 may be deteriorated for the above reasons.

In an embodiment, in order to prevent the deterioration of the speech recognition performance of the robot 100 due to the above reasons, the robot 100 may stop estimating a speech recognition interference factor in the period in which the transient sound exists P. Since estimation of an interference factor is stopped, removal of the interference factor may also be stopped.

This is to suppress speech distortion and deterioration of the speech recognition performance of the robot 100, which are caused by estimation and removal of an interference factor for a transient sound that will soon disappear due to a short existing period thereof.

The robot 100 may recognize the user's speech command from the received sound without estimating and removing a speech recognition interference factor in the existing period P of the transient sound. If, due to interference from a transient sound, the robot 100 is unable to accurately recognize the speech command in the existing period P of the transient sound, the speech command in the existing period P of the transient sound is recognized by a separate method.

The method of recognizing a speech command is the same as the procedure of estimating a speech command described below, and it will be thus described in detail below.

In another embodiment, the robot 100 may stop recognizing a user's speech command in the period in which the transient sound exists P. In a case of recognizing a speech command in the period in which the transient sound exists P, it is difficult to recognize the speech command due to interference from a transient sound, and if estimation and removal of an interference factor is performed, the speech recognition performance of the robot 100 may be deteriorated for reasons such as distortion of a speech command that is inputted immediately after the transient sound disappears.

Therefore, the robot 100 may suppress deterioration of the speech recognition performance by stopping recognition of the speech command in the period in which the transient sound exists P.

The robot 100 may fail to identify or may erroneously identify a speech command that is inputted in the period in which the transient sound exists P, by stopping estimation of an interference factor in the period in which the transient sound exists P or stopping recognition of the speech command, and this may cause an error in speech recognition by the robot 100. A countermeasure against this includes the speech command estimation described in detail below.

The robot 100 may estimate a user's speech command in the period in which the transient sound exists P. The robot 100 may estimate, as a user's speech command, a sentence most similar to a sentence uttered by the user from among sentences stored in the robot 100.

For example, estimation of the speech command is specifically as follows.

A sentence uttered by the user is "jigeum norae jom deul/lyeo/jullae" ("Can you play some songs now"). If the robot 100 correctly recognized the uttered sentence, the robot 100 recognizes the sentence as a command "norae deul/lyeo/jullae" ("play song"). Since "jigeum" ("now") and "jom" ("some") have nothing to do with the robot 100 performing the command, the robot 100 may not recognize "jigeum" and "jom" as commands.

At this time, if a transient sound is generated in a period where /lyeo/ is uttered, and the robot 100 fails to recognize the /lyeo/, the command that the robot 100 actually recognizes is "norae deul/?/jullae". Here, the "?" indicates that the robot 100 has failed to recognize the speech command.

As the sentence that is most similar to "norae deul/?/jullae" among sentences stored in the robot 100, the robot 100 may estimate "norae deul/lyeo/jullae" as the user's speech command, and may perform an operation according thereto.

On the other hand, due to a transient sound, the robot 100 may recognize, as a command, "norae deul/kkeo/jullae" or "norae deul/ga/jullae" from the sentence uttered by the user. This is because the sound is distorted due to interference from a transient sound, from /lyeo/ to /kkeo/ or /ga/ in the period where /lyeo/ is uttered, and therefore a speech recognition error of the robot 100 has occurred.

Since the robot 100 does not have "norae deul/kkeo/jullae" or "norae deul/ga/jullae" as a command stored therein, the robot 100 may estimate, as the user's speech command, "norae deul/lyeo/jullae", which is the most similar sentence among the sentences stored in the robot 100, and may perform an operation according thereto.

In an embodiment, the robot 100 can effectively suppress occurrence of a speech recognition error due to a transient sound, by estimating a user's speech command in a period in which speech command recognition is stopped or estimation of a speech recognition interference factor is stopped due to the transient sound.

Figure 7:
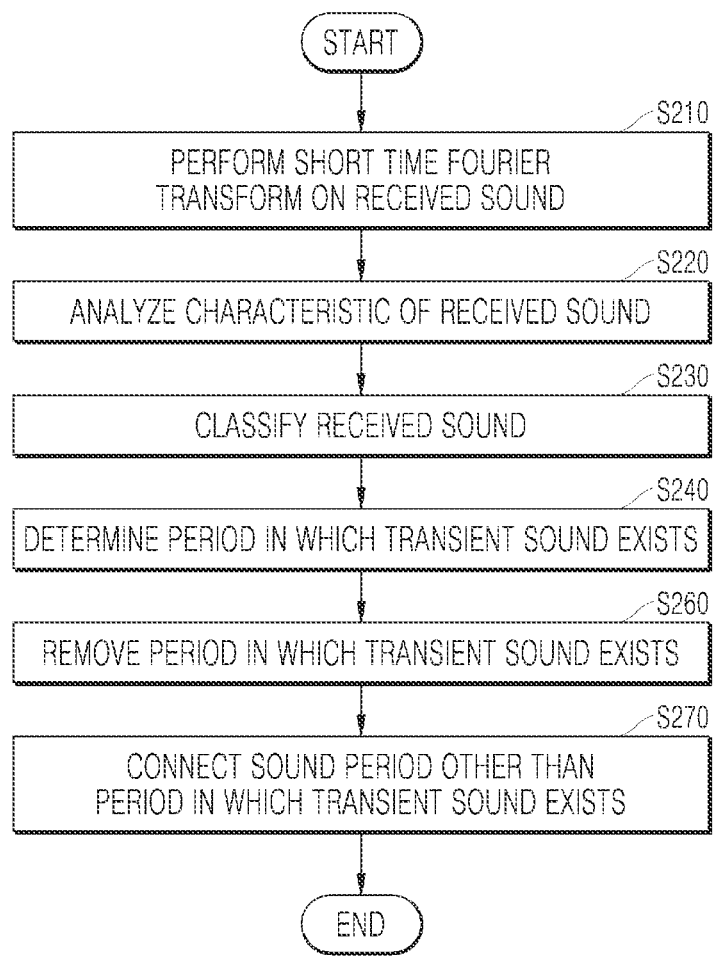
FIG. 7 is a flowchart for illustrating a method for processing sound according to another embodiment.
Figure 8:
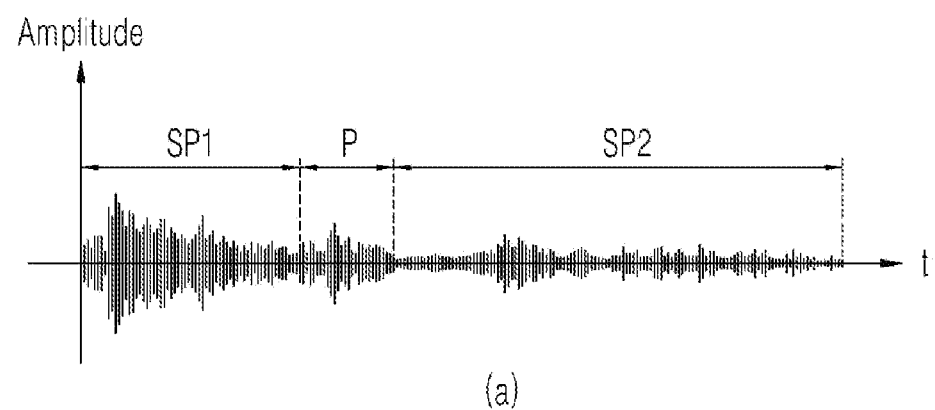
FIG. 8 is a diagram for illustrating a method for processing sound according to an embodiment.
Figure 8:
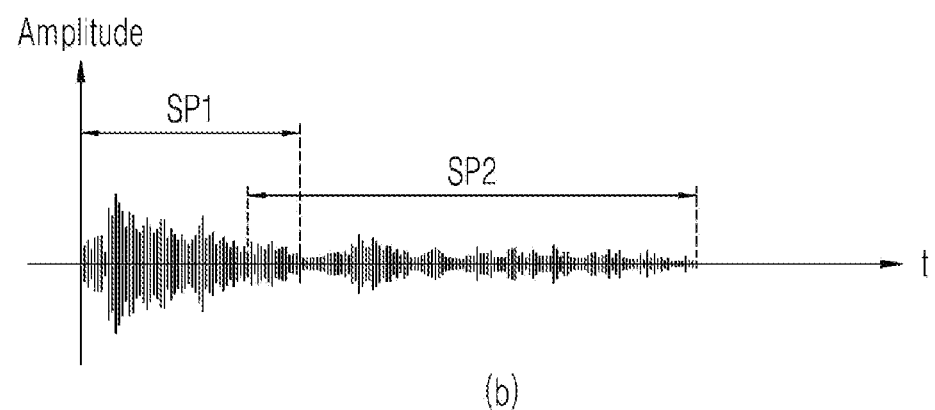

FIG. 7 is a flowchart for illustrating a method for processing sound according to another embodiment. FIG. 8 is a diagram for illustrating a method for processing sound according to an embodiment. In FIG. 8, the horizontal axis indicates time, and the vertical axis indicates amplitude of a sound.

Referring to FIG. 7, after determining the period in which the transient sound exists P, the robot 100 may remove the period in which the transient sound exists P (S260). The received sound is continuously distributed with respect to time, and the robot 100 removes the period in which the transient sound exists P from the continuous sound distribution.

This is to suppress, by removing the period in which the transient sound exists P, occurrence of a speech recognition error of the robot 100 due to the transient sound in the period. The user's speech command that is inputted in the period in which the transient sound exists P may be dealt with by the aforementioned method of estimating a speech command.

The robot 100 may connect sound periods other than the period in which the transient sound exists P (S270). Referring to FIG. 8, the robot 100 may connect a first sound period SP1, which is a sound period before the period in which the transient sound exists P, and a second sound period SP2, which is a sound period after the period in which the transient sound exists P, to each other.

The robot 100 can accurately recognize the user's speech command without interference from the transient sound, by recognizing the user's speech command in a sound signal from which the period in which the transient sound exists P has been excluded.

When the first sound period SP1 and the second sound period SP2 are connected, discontinuity may occur at the point at which each period is connected, that is, the boundary where the rear end of the first sound period SP1 and the front end of the second sound period SP2 meet.

This discontinuity may cause spectral distortion of the sound. For example, spectral distortion, in which amplitudes appear discontinuously in the boundary between the first sound period SP1 and the second sound period SP2, may occur. This spectral distortion deteriorates the speech recognition performance of the robot 100, and thus a method of removing or alleviating the discontinuity is required.

As one method of removing or alleviating the discontinuity, an overlap-add method may be used. That is, the robot 100 may connect the rear end of the first sound period SP1 and the front end of the second sound period SP2 by causing these to overlap each other, which is referred to as an overlap-add.

Via the overlap-add, the discontinuity of the boundary between the first sound period SP1 and the second sound period SP2 may be removed or alleviated. A period in which the first sound period SP1 and the second sound period SP2 overlap each other may be appropriately selected in consideration of both an aspect for removing or alleviating the discontinuity and deterioration of the speech recognition performance of the robot 100, which may occur due to the overlap.

As another method of removing or alleviating the discontinuity, a windowing method may be used. Here, windowing refers to performing convolution or multiplication of a window function on a sound signal.

That is, the robot 100 may perform convolution or multiplication of a window function on a sound signal existing in the first sound period SP1 and the second sound period SP2.

Via the windowing, the discontinuity of the boundary between the first sound period SP1 and the second sound period SP2 may be removed or alleviated. The window function may include, for example, a cosine, raised cosine, Hamming, Hanning, Blackman, triangular, or Gaussian function.

In an embodiment, in order to remove or alleviate the discontinuity of the boundary between the first sound period SP1 and the second sound period SP2, overlap-adding or windowing may be applied separately or together.

The above-described embodiments may be implemented in the form of computer programs executable via various elements on a computer, and such computer programs may be recorded in computer-readable media. The computer-readable media may include: magnetic media such as a hard disk, a floppy disk, and a magnetic tape; optical recording media such as CD-ROM and DVD; magneto-optical media such as a floptical disk; and a hardware device, such as ROM, RAM, and a flash memory, specially configured to store and perform program instructions.

The computer programs may be those specially designed and configured for the purposes of the present disclosure, or they may be of the kind well known and available to those skilled in the computer software arts. Examples of the computer programs may include a high-level language code executable by a computer using an interpreter, etc., as well as a machine language code produced by a compiler.

Although only a limited number of embodiments have been described above, various other embodiments are possible. The technical contents of the above-described embodiments may be combined into various forms as long as they are not incompatible with one another, and thus may be implemented in new embodiments.

INDUSTRIAL APPLICABILITY

In the embodiments, a robot capable of speech recognition and autonomous driving can accurately determine a period in which a transient sound generated due to an impact when the robot passes through an obstacle exists, by determining a travel distance and a travel speed, and based on this, the robot can effectively respond to deterioration of speech recognition performance due to the transient sound.

What is claimed is:

1. A method for processing sound used in a speech recognition robot, the method comprising:
    recognizing an obstacle existing in a travel path, by a robot;
    calculating a travel distance to the obstacle, by the robot;
    calculating a travel speed, by the robot; and
    determining, by the robot, a point in time at which a transient sound due to an impact caused by passing through the obstacle is generated,
    wherein the robot is configured to determine the point in time at which the transient sound is generated, based on the travel speed and the travel distance to the obstacle.

2. The method of claim 1, wherein the robot is configured to:
    recognize the obstacle by using a mounted camera; and
    when the robot is traveling, determine whether to pass through the obstacle.

3. The method of claim 2, wherein the robot is configured to:
    determine, via the camera, a shortest distance measured along a shortest path to the obstacle;
    measure an angle at which the travel path is separated apart from the shortest path; and
    calculate the travel distance to the obstacle based on the shortest distance and the measured angle.

4. The method of claim 1, wherein the robot is configured to:
    recognize the obstacle based on map data; and
    when the robot is traveling, determine whether to pass through the obstacle.

5. The method of claim 4, wherein the robot is configured to calculate the travel distance to the obstacle based on the map data.

6. The method of claim 1, wherein the robot is configured to:
    calculate an arrival time at a transient sound generation point by dividing the travel distance by the travel speed; and
    determine the point in time at which the transient sound is generated, based on the calculated arrival time.

7. A computer program stored in a computer-readable recording medium so as to execute, using a computer, the method according to claim 1.

* * * * *